D. B. MACDONALD.
DRYING APPARATUS EMPLOYED IN THE MANUFACTURE OF BOOTS AND SHOES.
APPLICATION FILED OCT. 6, 1920.

1,413,862.

Patented Apr. 25, 1922.

David Baird Macdonald
by Connolly Bros.
Attorneys.

D. B. MACDONALD.
DRYING APPARATUS EMPLOYED IN THE MANUFACTURE OF BOOTS AND SHOES.
APPLICATION FILED OCT. 6, 1920.

1,413,862.

Patented Apr. 25, 1922.

David Baird Macdonald
by Connolly Bros.
Attorneys

D. B. MACDONALD.
DRYING APPARATUS EMPLOYED IN THE MANUFACTURE OF BOOTS AND SHOES.
APPLICATION FILED OCT. 6, 1920.

1,413,862.

Patented Apr. 25, 1922.
5 SHEETS—SHEET 5.

David Baird Macdonald
by Connolly Bros
Attorneys

UNITED STATES PATENT OFFICE.

DAVID BAIRD MACDONALD, OF LEICESTER, ENGLAND.

DRYING APPARATUS EMPLOYED IN THE MANUFACTURE OF BOOTS AND SHOES.

1,413,862.  Specification of Letters Patent.  Patented Apr. 25, 1922.

Application filed October 6, 1920. Serial No. 415,045.

*To all whom it may concern:*

Be it known that I, DAVID BAIRD MACDONALD, a subject of the King of Great Britain, residing at 33 Vulcan Road, Leicester, England, have invented certain new and useful Improvement in or Relating to Drying Apparatus Employed in the Manufacture of Boots and Shoes, of which the following is a specification, reference being had therein to the accompanying drawing.

This invention relates to drying apparatus employed in the manufacture of boots and shoes, and concerns apparatus for treating (e. g. mellowing or drying) desired parts of the work by means of a current of heated air directed upon the part or parts to be treated.

Apparatus of this character is described in my prior British specification No. 134089, and the present invention comprises a concrete or constructional form of the modification referred to in said specification said modification consisting of a round body having apertures or guiding means in its periphery for positioning the toes in relation to a circular series of nozzles on the inside, said body being rotatably mounted so that the work may be put in on one side, and after the body has been turned, be taken out on the other side.

The invention contemplates a form of such apparatus mainly intended for drying the toes and adjacent parts of boots and shoes after lasting and prior to the attachment of the sole. For instance, it is proposed to position the apparatus between the knocking-up machine and the sole attacher so that the operator of the first machine can put the work, when knocked-up, into one side of the apparatus which latter, when full on the one side, can be rotated to bring the work around to the other side so that it can be taken out as required by the operator of the other machine. Thus while the sole attaching operator is taking the work out on his side of the apparatus, the knocking-up operator is again filling his side of the apparatus, it being understood that the second operator (the sole attacher) commences on the work which was first placed in the apparatus by the first operator and that the toe of each boot or shoe while it remains in the apparatus is subjected to a directed current or jet of heated air which drives it.

Or in another method employed wherein the work is knocked-up after drying, the apparatus covered by the invention may be situated between the lasting machine and the knocking-up machine and used in a similar manner by the respective operators of these machines.

A form of the apparatus also contemplated by the invention will be hereinafter described for mellowing or conditioning the work prior to lasting.

According to this invention the apparatus comprises a central vertical column or stand upon which a surrounding cylindrical or other suitable body is rotatably mounted said body having formed in its periphery or outer face the apertures to receive and position the toes of the work and also having outwardly projecting means (such as wire frames) to support the work in the rear, the inner series of nozzles receiving their supply of heated air from an inner compartment or chamber formed in the body and to which the heated air is conducted by way of the central column.

It is also a feature of the apparatus that each aperture in the body may be automatically closed upon removal of the work to prevent the air from the nozzle blowing out upon the operator. This may be achieved by the provision on the inside of each aperture of a spring or weight controlled flap or shutter adapted to be displaced by entrance of the boot or shoe toe and to return to closing position upon removal of the work.

A practical embodiment of the invention is shown by way of example in the accompanying drawings wherein:—

Figures 4 to 7 are drawn to a larger scale than the other figures, and throughout the drawings like parts are designated by the same reference characters.

Figure 1:
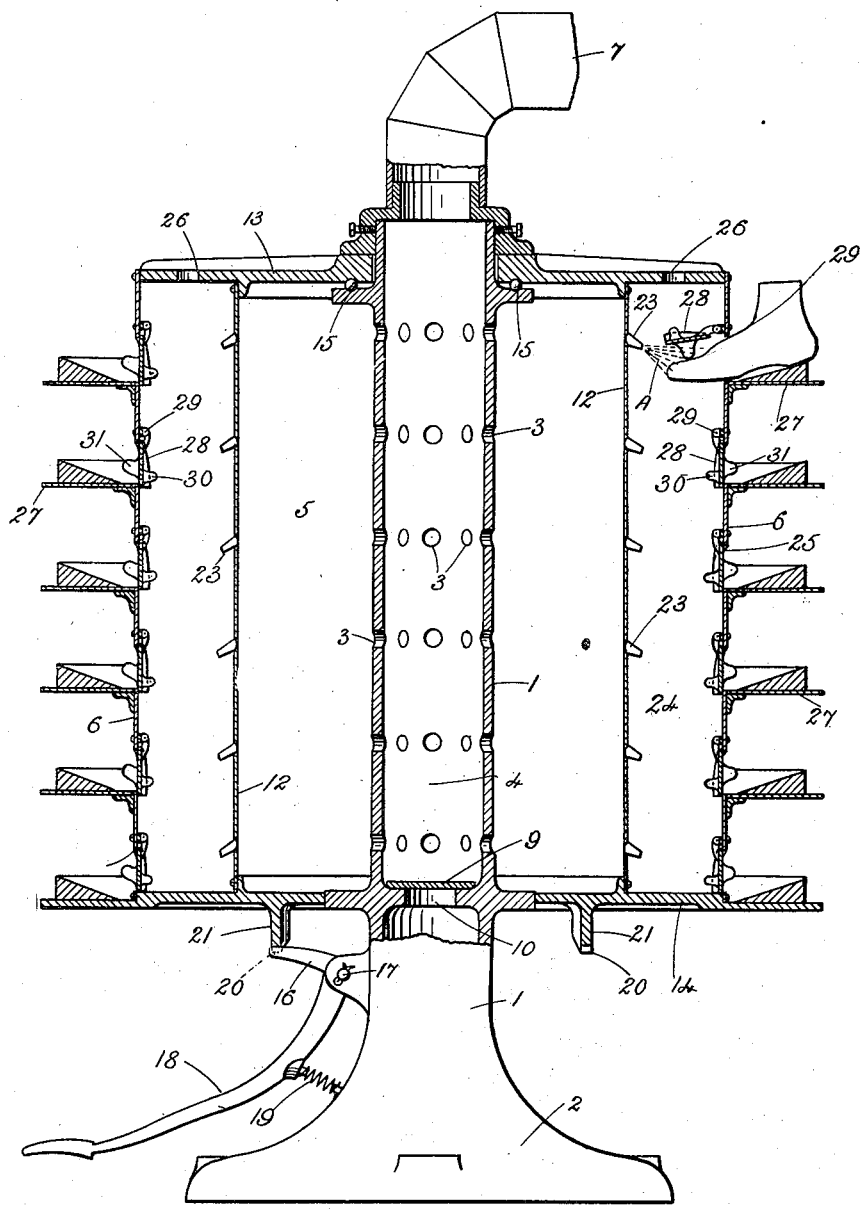
Figure 1 is a vertical section of an apparatus for drying the toes and adjacent parts of boots and shoes.
Figure 2:
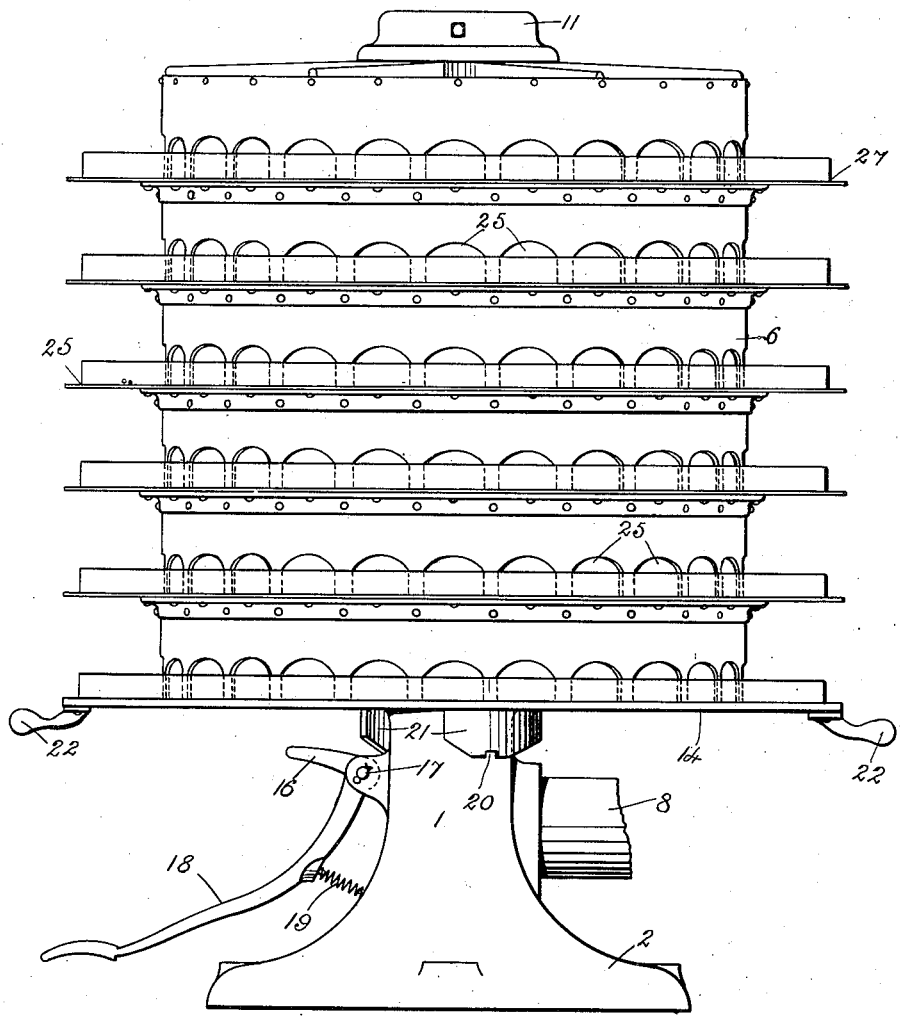
Figure 2 is an elevation of a slightly modified form thereof.
Figure 3:
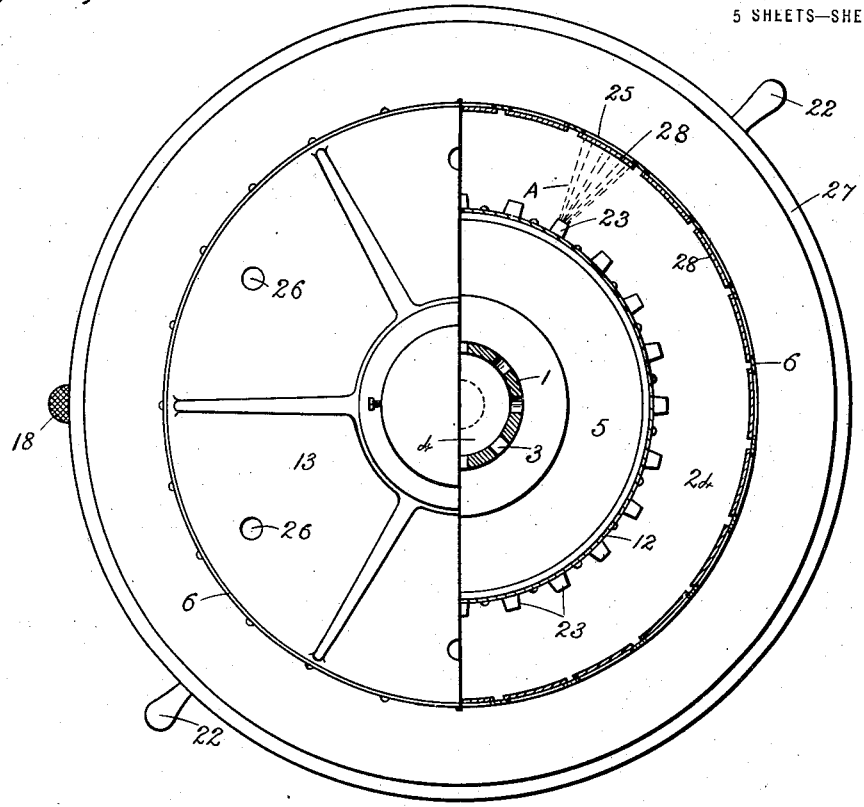
Figure 3 is a half sectional plan of the apparatus shown in Figures 1 and 2.
Figure 4:
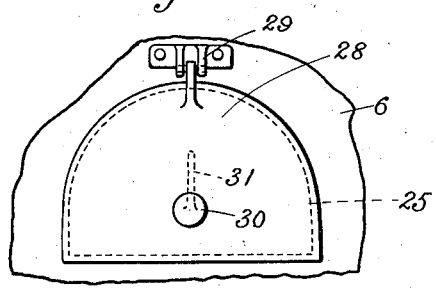
Figure 4 is a rear elevation of one of the hinged flaps for closing the apertures in the body.
Figure 5:
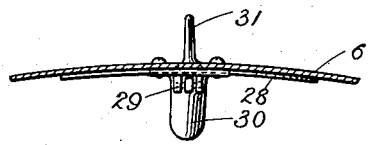
Figure 5 is a plan of same.
Figure 6:
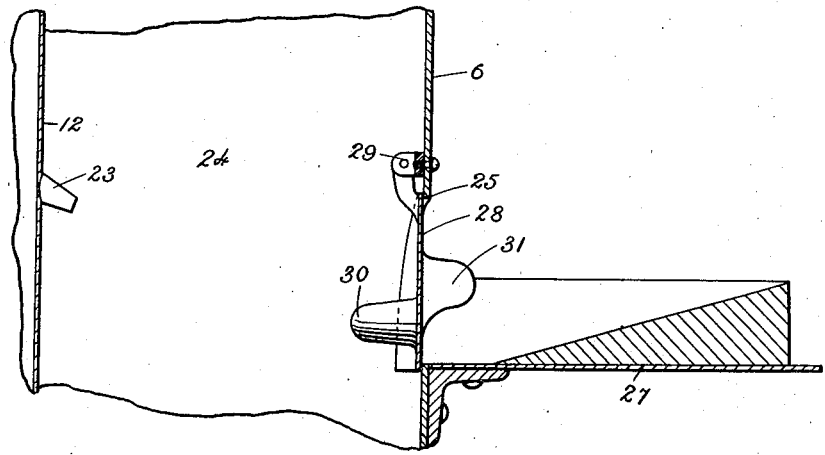
Figure 6 is a vertical section showing one of the flaps in the closed position.

In the form of apparatus shown in Figures 1, 2 and 3 of the drawings, a central vertical column 1 is furnished with a base 2 to constitute a self supporting stand for the apparatus. The column 1 is made hollow and in the upper part of its length has openings 3 formed through its side for the purpose of enabling air, preferably heated, to pass from the interior 4 into an inner chamber 5 of a rotatable body 6 surrounding said column.

The air may be heated by any suitable exterior means and conducted to the column 1 by a pipe such as 7 (Figure 1) which is a top feed arrangement, or by a pipe 8 as shown in Figure 2 which is a bottom feed arrangement. In the arrangement shown in Figure 1, the hollow column is closed at 9. In the alternative arrangement (Figure 2) the column is left open at the bottom 10 to admit the air but is closed at the top by a cap 11.

The rotatable body 6 consists of a cylinder, preferably closed at the top and bottom except as hereinafter specified, and having therein a smaller cylinder 12 both cylinders 6 and 12 being concentric with the central column 1. In the construction shown in Figures 1 and 3, the cylindrical shells 6 and 12 are secured to an upper plate 13 and a lower plate 14. The body is mounted upon the column 1 by means of a bearing 15, preferably of the ball or roller type. For the purpose of locking the body in its different positions after rotation, a catch 16 pivoted at 17 and operable by a treadle 18 and spring 19, engages with a notch 20 (Figure 2) in the lower edge of downwardly projecting parts 21 on the lower plate 14. On opposite sides of the notch, the edge of the part 21 is inclined so that it will automatically depress the catch 16 against the action of spring 19. The said catch is self acting for engaging the notch and is moved down by the treadle to release the body for rotation. Other locking means may be adopted. One or more projecting handles or knobs 22 (Figures 2 and 3) may be furnished on the body for use in rotating the same.

The inner cylinder 12 of the body is made of larger diameter than the column 1 which it surrounds so as to form the air receiving space or chamber 5 already referred to. This cylinder 12 has formed or secured in its wall nozzles 23 which are arranged to discharge the air in a downwardly inclined and radial direction in the space 24 between the inner and outer cylindrical walls 12 and 6 as shown at A Figures 1, 3 and 7. Formed in the outer cylindrical wall 6 are apertures 25 through which boot toes can be inserted so that they come under the influence of the air issuing from the nozzles in the manner represented in Figures 1 and 7.

Figure 7:
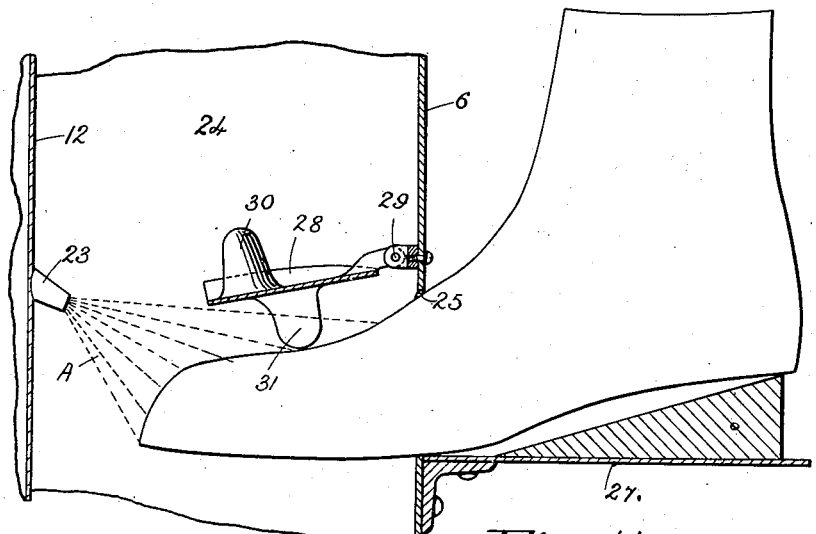
Figure 7 is a similar vew showing the flap raised and with a shoe in position for treatment.

The apertures 25 are preferably made of such a shape and size that while they serve, when the work is inserted as indicated in Figures 1 and 7, to guide the toes into position in line with or under the air jets A, the work will not entirely close said apertures but will leave sufficient space for the heated air or some of it to pass out over the vamp and up the front of the boot or shoe. The escaping air is thus directed upwards by the work which prevents it from blowing upon the operator. To provide for the escape of air from the jet chamber 24 the upper plate 13 has openings 26 therein.

Preferably the work is supported upon exterior shelves 27 which surround the body 6.

It will be understood that the apertures 25 correspond in number and position with the nozzles. For closing the apertures to prevent the air from blowing straight out upon the operator when the work is removed, there is provided at the back of each, a flap 28 (Figures 1 and 4 to 7) hingedly carried at 29 so as to swing upwards as indicated in Figure 7. The flap falls to closing position by gravity in which movement it is assisted by a weight 30 on the back thereof. When the work is inserted, the toe of same by contact with a projecting piece 31 on the front of the flap, raises the latter as indicated in Figure 7.

The opposite sides of the rotatable body 6 may be painted different colours to enable the operators to clearly distinguish one set of boots or shoes from the other. It is proposed to provide the rotatable body 6 with seventy-two of the apertures 25 on each side, these being arranged in six horizontal rows as shown thus making the apparatus capable of holding one hundred and forty-four boots or shoes when full. The number and disposition of the apertures may however, be varied according to the required capacity of the apparatus.

Figure 8:
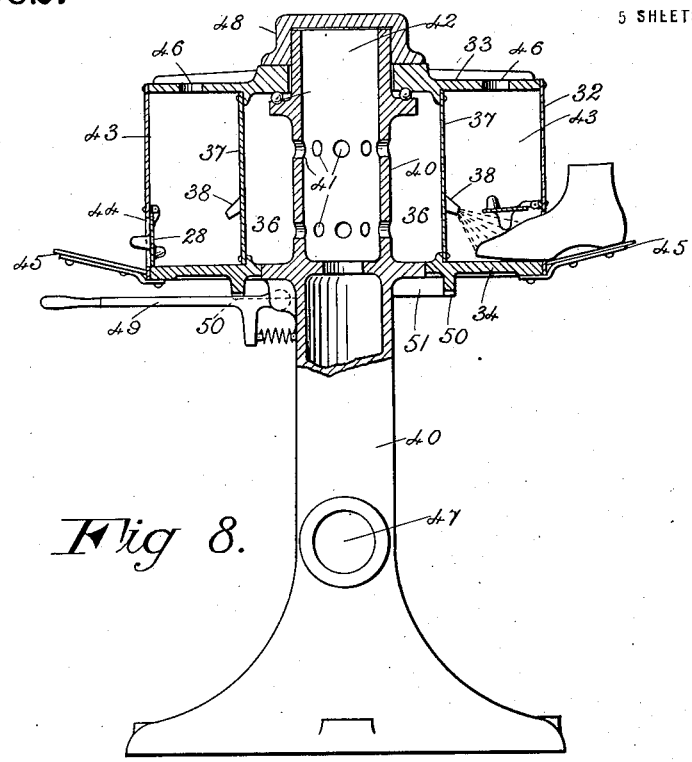
Figure 8 is a sectional elevation of a form of the apparatus suitable for mellowing the work prior to lasting.
Figure 9:
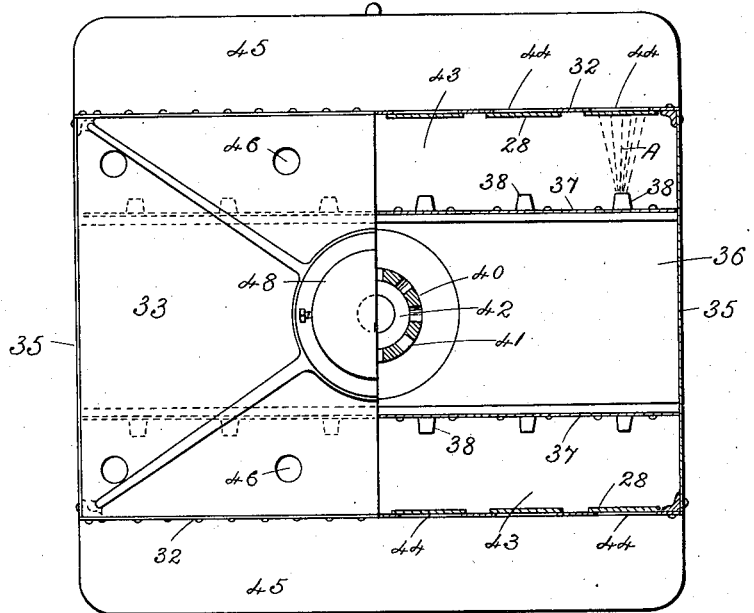
Figure 9 is a half sectional plan of the same.

The invention may also be carried out in a form suitable for mellowing the work, particularly the toes, prior to lasting. For instance such apparatus may be situated between the pulling-over machine and the lasting machines. It may be constructed with a cylindrical body as already described, but preferably for the purpose mentioned it is provided with a body of rectangular form having the apertures arranged along each side. An example of this form of apparatus is shown in Figures 8 and 9 and comprises a rectangular body 32 composed of a top plate 33, bottom plate 34 and outer walls 32 and 35. The body has an inner chamber 36 which extends horizontally and is formed by the inner vertical walls 37 which latter are provided with nozzles 38. The body is rotatably mounted by a ball or roller bearing 39 upon a central column 40 having openings 41 which allow air to pass from the hollow interior 42 of the column to the chamber 36 from which it is discharged by the nozzles 38 in the form of jets A into the compartments 43. The outer walls 32 have apertures 44 formed therein to receive the toes of the work and guide them into position under the air jets, the rear part of the work being supported by an exterior shelf 45 or equivalent. The apertures 44 may be closed by hinged flaps 28 of the character already referred to, holes 46 in the upper plate 33 being provided to allow the air to escape from the compartments 43.

The air, which in this case may be moistened before being discharged on to the work for the purpose of softening or conditioning the toes prior to lasting may be supplied to the lower part of the column 40 by a pipe 47 the column being closed at the top by a cap 48, or it may be admitted to the top of said column in the manner shown in Figure 1. A lesser number of apertures may be required in this form of the invention, probably six on each side as shown being sufficient to enable the work to pass from one operator to the other at the desired rate.

The rotatable body 32 may be held in its two positions by a spring pressed locking lever 49 which enters recesses 50 in an annular flange 51 on the bottom plate 34.

Claims:

1. Apparatus for drying and conditioning boots and shoes, comprising, a central column or stand, a body rotatably mounted upon said column and having in its outer face a series of apertures to receive the work, means on said body to support the work, an inner chamber in said body, a series of nozzles in the wall of said inner chamber corresponding to the apertures in the outer face of the body, and means to supply air to said inner chamber by way of the central column, said air issuing in the form of jets from the nozzles to impinge upon the work.

2. Apparatus for drying and conditioning boots and shoes, comprising, a central hollow column or stand, a body rotatably mounted upon said column and having a series of apertures in its outer face to receive and position the work, means on said body to support the work, an inner chamber in said body surrounding the column the latter having openings to allow air to pass from the interior thereof to the said chamber, and a series of nozzles in the wall of said chamber, said nozzles corresponding to the apertures and adapted to direct jets of air upon the work inserted through the apertures.

3. Apparatus for drying and conditioning boots and shoes, comprising, a central hollow column or stand, a body rotatably mounted upon said column and having a series of apertures in its outer face to receive and position the work, means on said body to support the work, an inner chamber in said body surrounding the column the latter having openings to allow air to pass from the interior thereof to the said chamber, a series of nozzles in the wall of said chamber, said nozzles corresponding to the apertures and adapted to direct jets of air upon the work inserted through the apertures, and a flap to automatically close each aperture said flaps being forcibly opened by insertion of the work.

4. Apparatus for drying and conditioning boots and shoes, comprising, a central hollow column or stand, a body rotatably mounted upon said column and having a series of apertures in its outer face to receive and position the work, means on said body to support the work, an inner chamber in said body surrounding the column the latter having openings to allow air to pass from the interior thereof to the said chamber, a series of nozzles in the wall of said chamber, said nozzles corresponding to the apertures and adapted to direct jets of air upon the work inserted through the apertures, a flap to automatically close each aperture said flaps being forcibly opened by insertion of the work, and locking means to hold the rotatable body in its different positions after rotation.

5. Apparatus for drying and conditioning boots and shoes, comprising, a central hollow column or stand adapted to receive an air supply to the interior thereof, a cylindrical body surrounding and rotatably mounted upon said column, an inner cylindrical wall in said body forming an inner chamber surrounding and open to the column the latter having holes to allow passage of air from its hollow interior to the said chamber, an outer cylindrical wall on said body forming an outer chamber, said outer wall having a series of apertures therein adapted to receive and position the work, a series of nozzles in the inner wall corresponding to said apertures and adapted to direct jets of air upon the work inserted through the apertures, circular shelves on the outer wall of the body to support the work, and a hinged gravity actuated flap to close each aperture on removal of the work therefrom, substantially as described.

In testimony whereof I affix my signature in presence of two witnesses.

DAVID BAIRD MACDONALD.

Witnesses:
R. W. C. TAYLOR,
GEORGE LESTER.